United States Patent
Urabe et al.

(10) Patent No.: US 7,898,597 B2
(45) Date of Patent: Mar. 1, 2011

(54) VIDEO PROCESSING APPARATUS AND CONTROL METHOD FOR THE VIDEO PROCESSING APPARATUS

(75) Inventors: Hirofumi Urabe, Kawasaki (JP); Shuntaro Aratani, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 777 days.

(21) Appl. No.: 11/939,284

(22) Filed: Nov. 13, 2007

(65) Prior Publication Data

US 2008/0143877 A1    Jun. 19, 2008

(30) Foreign Application Priority Data

Dec. 19, 2006   (JP) .................................. 2006-341402

(51) Int. Cl.
*H04N 5/46*     (2006.01)
(52) U.S. Cl. .......................... 348/555; 348/554; 348/581
(58) Field of Classification Search .......... 348/554–558, 348/581, 582, 441–459
See application file for complete search history.

(56) References Cited

U.S. PATENT DOCUMENTS

| 5,187,575 | A | * | 2/1993 | Lim ............................... 348/558 |
| 5,276,515 | A | | 1/1994 | Katsumata et al. |
| 5,754,242 | A | * | 5/1998 | Ohkami ......................... 348/441 |
| 7,542,097 | B2 | * | 6/2009 | Suito ............................. 348/555 |
| 2007/0296866 | A1 | * | 12/2007 | Fujisawa ........................ 348/571 |

FOREIGN PATENT DOCUMENTS

| JP | 5-252457 A | 9/1993 |
| JP | 07-281637 A | 10/1995 |
| JP | 2001-346125 A | 12/2001 |
| JP | 2002-014664 A | 1/2002 |
| JP | 2005-190273 A | 7/2005 |

* cited by examiner

*Primary Examiner* — M. Lee
(74) *Attorney, Agent, or Firm* — Canon USA Inc IP Division

(57) ABSTRACT

A video processing apparatus uses information related to an image quality of an inputted video signal which is to be displayed on a display apparatus and a determination table in which video display sizes previously set in accordance with video resolution or bit rate are held to determine an optimal size for displaying the inputted video signal.

6 Claims, 9 Drawing Sheets

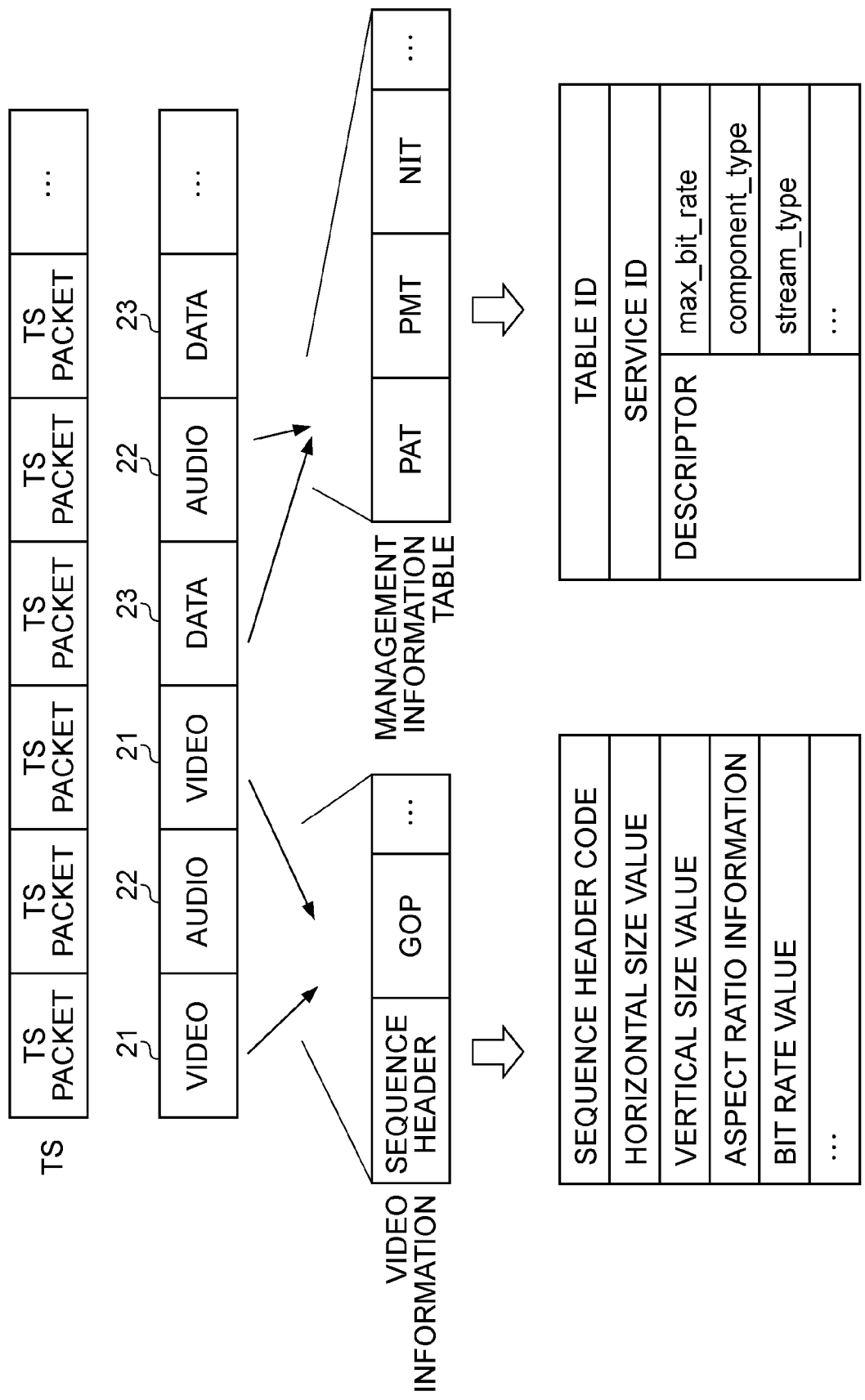

FIG. 6

| RESOLUTION | BIT RATE | VIDEO DISPLAY SIZE |
|---|---|---|
| 480i | 4 Mbps OR LOWER | 1440 × 960 (2 ×) |
| | 4 TO 8 Mbps | 1800 × 1200 (2.5 ×) |
| | 8 Mbps OR HIGHER | 2160 × 1440 (3.0 ×) |
| 480p | 4 Mbps OR LOWER | 1620 × 1080 (2.25 ×) |
| | 4 TO 8 Mbps | 1980 × 1320 (2.75 ×) |
| | 8 Mbps OR HIGHER | 2340 × 1560 (3.25 ×) |
| HD (720p OR HIGHER) | -- | FULL SCREEN |

FIG. 7

| RESOLUTION | FORMAT | BIT RATE | VIDEO DISPLAY SIZE |
|---|---|---|---|
| 480i | MPEG2 | 4 Mbps OR LOWER | 1080 × 720 (1.5 ×) |
| | | 4 TO 8 Mbps | 1440 × 960 (2 ×) |
| | | 8 Mbps OR HIGHER | 1800 × 1200 (2.5 ×) |
| | H.264 | 4 Mbps OR LOWER | 1440 × 960 (2 ×) |
| | | 4 TO 8 Mbps | 1800 × 1200 (2.5 ×) |
| | | 8 Mbps OR HIGHER | 2160 × 1440 (3.0 ×) |
| 480p | MPEG2 | 4 Mbps OR LOWER | 1260 × 840 (1.75 ×) |
| | | 4 TO 8 Mbps | 1620 × 1080 (2.25 ×) |
| | | 8 Mbps OR HIGHER | 1980 × 1320 (2.75 ×) |
| | H.264 | 4 Mbps OR LOWER | 1620 × 1080 (2.25 ×) |
| | | 4 TO 8 Mbps | 1980 × 1320 (2.75 ×) |
| | | 8 Mbps OR HIGHER | 2340 × 1560 (3.25 ×) |
| HD (720p OR HIGHER) | -- | -- | FULL SCREEN |

FIG. 8

| ERROR AMOUNT | MAGNIFICATION FACTOR |
|---|---|
| LARGE | 0.8 × |
| MEDIUM | 0.9 × |
| NONE | 1.0 × |

FIG. 9

| SIGNAL TYPE | TERMINAL TYPE | MAGNIFICATION FACTOR |
|---|---|---|
| ANALOG SIGNAL | COMPOSITE | 0.7 × |
| | S TERMINAL | 0.8 × |
| | D TERMINAL, COMPONENT TERMINAL | 0.9 × |
| DIGITAL SIGNAL | DV, HDMI, IEEE1394 (TS) | 1.0 × |

VIDEO PROCESSING APPARATUS AND CONTROL METHOD FOR THE VIDEO PROCESSING APPARATUS

BACKGROUND OF THE INVENTION

1. Field of the Invention

The present invention relates to a video processing apparatus for executing, when an input video signal is displayed on a display apparatus, a video processing for magnifying a video signal to an arbitrary size, and a control method for the video processing apparatus.

2. Description of the Related Art

In recent years, after the launch of digital broadcasting, popularization of a high image quality video such as HD (High Definition) having 1920×1080 pixels has been advanced. Furthermore, videos with a higher image quality than the HD are being proposed such as a digital cinema having about four times as many as the number of pixels of the HD (4096×2160) and UHD (Ultra High Definition) having about 16 times as many as the number of pixels of the HD (7680×4320). In accordance with the situation, trends of a larger screen and a higher definition are also progressed in display apparatuses including a display and a projector for displaying these videos.

In a case where a video having the small number of pixels such as a SD (Standard Definition video is displayed on a display apparatus having the large screen and high definition, when one pixel of the SD video is allocated to one pixel of the display apparatus having the large number of pixels, the display size becomes smaller as compared with the screen size, and visibility is not satisfactory. For example, when the SD video having 720×480 pixels is directly displayed on the display apparatus having 4000×2000 pixels, an area on which no video is displayed becomes extremely large, and the video is displayed in a small size as compared to the screen size. As the high definition display apparatus represented by the digital cinema or the like has a large screen, the video is viewed by a viewer at a place relatively remote from the screen. Therefore, the video displayed in the small size is difficult to recognize.

For this reason, there is known a method of magnifying a low resolution video to a full screen by using a technique disclosed in Japanese Patent Laid-Open No. 5-252457 in accordance with a predetermined display mode such as a size panel display or a letter box display.

According to the technique disclosed in Japanese Patent Laid-Open No. 5-252457, it is possible to magnify a signal with any resolution to a predetermined size such as a full screen size of the display. However, in a case where the video is magnified to the predetermined size, the image is blurred due to an influence of an image processing such as a pixel interpolation processing. In particular, as compared with a case where a video originally having the large number of pixels, a magnifying factor for a low resolution video having the small number of pixels becomes also large. In other words, the influence of the image quality degradation caused by the magnification processing is large in the lower resolution video.

Therefore, in a case where the low resolution or low image quality video content is magnified and displayed on the high definition display apparatus, it is necessary to execute such a contradict control that the visibility of the viewer should not be lowered and the image quality degradation caused by the magnification processing is suppressed.

SUMMARY OF THE INVENTION

The present invention addresses the above-described problems and provides a video processing apparatus in which information on an image quality of a video displayed on a display apparatus is determined, a video processing is executed for displaying the video in an appropriate size on the display apparatus in accordance with the image quality information, and a control method for the video processing apparatus.

According to an aspect of the present invention, a video processing apparatus for executing a video processing includes an input unit configured to receive a video signal, an obtaining unit configured to obtain information on an image quality of the video signal, a holding unit configured to hold video display size determination information in which the information on the image quality of the video signal is associated with information on a display size of the video corresponding to the information, and a control unit configured to determine the video display size of the video signal based on the information on the image quality and the video display size determination information.

Further features and aspects of the present invention will become apparent from the following detailed description of exemplary embodiments with reference to the attached drawings.

BRIEF DESCRIPTION OF THE DRAWINGS

FIG. 2 illustrates configuration examples of a digital broadcast signal and video information.

FIG. 6 is a schematic diagram of a determination table for determining the video display size according to an embodiment of the present invention.

FIG. 7 is a schematic diagram of the determination table for determining the video display size according to an embodiment of the present invention.

FIG. 8 is a schematic diagram of an adjustment table for the video display size in accordance with error information according to an embodiment of the present invention.

FIG. 9 is a schematic diagram of the adjustment table for the video display size in accordance with an input terminal type according to an embodiment of the present invention.

DESCRIPTION OF THE EMBODIMENTS

Exemplary embodiments of the present invention will now be described in accordance with the accompanying drawings.

Figure 1:
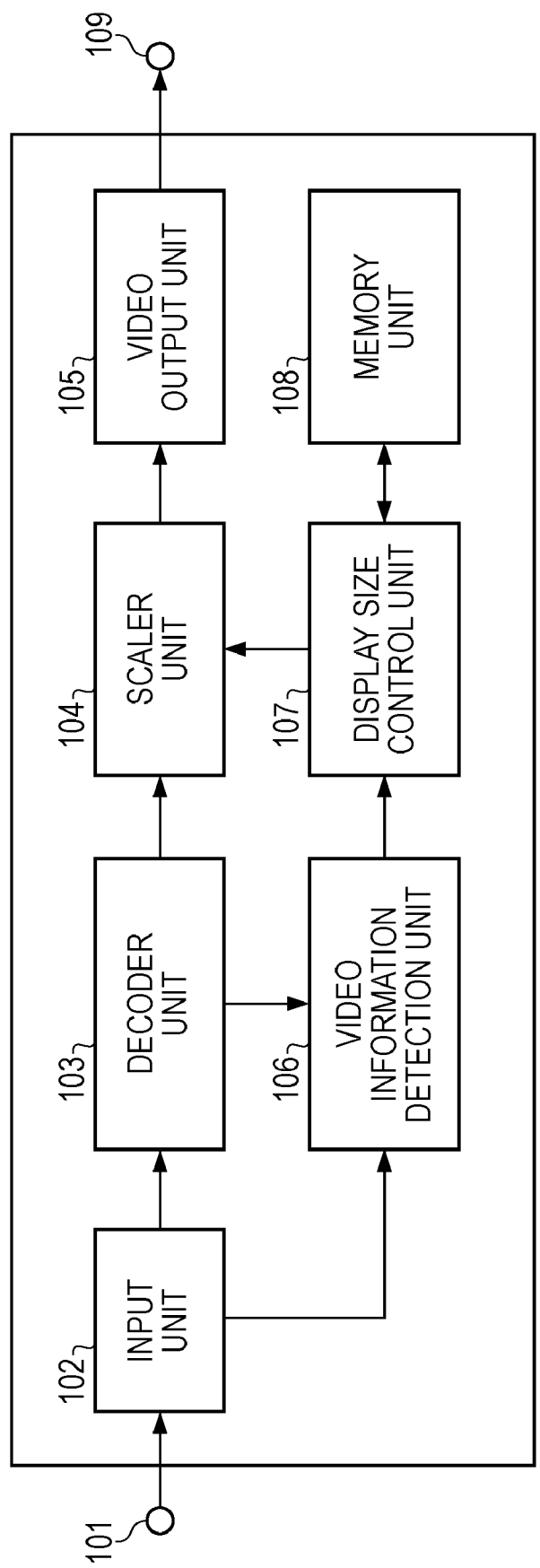
FIG. 1 is a block diagram of a video processing apparatus according to a first exemplary embodiment of the present invention.

FIG. 1 is a block diagram of a video processing apparatus according to a first exemplary embodiment of the present invention. Video signal input terminal 101 is connected to, for example, an output terminal of an external apparatus such as a broadcasting signal output terminal from an antenna, a video output terminal and a network terminal of a videocassette recorder, a DVD recorder, etc.

Broadcasting signals and video signals of the terminal connected to the input terminal 101, as well as various types of signal information of the external apparatus are input to input unit 102. A decoder unit 103 is configured to perform a decoding processing for decoding the video signal obtained by the input unit 102 into a video signal used for performing an actual display on a display.

According to this decoding processing, in a case of a digital signal, a reproduction processing for decoding the digital signal is performed. In a case of an analog signal, a digital conversion process such as an A/D conversion, a noise reduction processing for suppressing a noise of the video, etc. At the time of the decoding processing, error rate information of the digital signal at the time of the decoding, the information amount of the digital signal at the time of the A/D conversion, and video noise information are calculated.

A scaler unit 104 is configured to execute a scaling processing such as magnification or reduction of the video which has been decoded in the decoder unit 103. In other words, the scaler unit 104 adjusts the video display size. A video signal output unit 105 is configured to output the video which has been subjected to the scaling processing in the scaler unit 104. A video signal output terminal 109 is configured to output the video signal output from the video signal output unit 105 to a display apparatus (not shown) such as a display or a projector.

A video information detection unit 106 is configured to detect bit rate information or video information such as an encoding format of the video based on the input signal input from the input unit 102. Also, the video information detection unit 106 is configured to obtain the video information such as the error rate at the time of the decoding or the amount of noise from the decoder unit 103.

A display size control unit 107 is configured to determine the video display size based on the various pieces of video information detected and obtained by the video information detection unit 106 and video display size information previously held by a memory unit 108. The display size determined by the display size control unit 107 is applied to the scaling processing executed by the scaler unit 104.

FIG. 2 illustrates configuration examples of a digital broadcast signal and video information according to the present embodiment in a case where a digital broadcasting signal is received. As illustrated in FIG. 2, a digitalized broadcasting signal has a form called TS (Transport Stream) signal. The TS signal is prescribed by standards of IEC (International Electrotechnical Commission), IEEE (Institute of Electrical and Electronic Engineers), ARIB (Association of Radio Industries and Businesses), and other various standards and standard organizations. The TS signal is composed of a video unit 21 which is a motion image signal, an audio unit 22 which is an audio signal, and a data unit 23 which is other data signal.

When the video units 21 are collected and restructured, video data composed of sequence_header (sequence header), GOP (Group Of Pictures), etc. is obtained.

In this sequence header, a Sequence Header Code descriptor, a Horizontal Size Value descriptor, a Vertical Size Value descriptor, an Aspect Ratio Information descriptor, a Bit Rate Value descriptor, etc. are included.

The Horizontal Size Value descriptor describes the number of pixels in horizontal lines of the video and the Vertical Size Value descriptor describes the number of pixels in vertical lines of the video. Also, the Aspect Ratio Information descriptor describes an aspect ratio. Therefore, based on this information, it is possible to detect information related to a resolution of the input video. Also, the Bit Rate Value descriptor describes bit rate information of the video. Therefore, it is possible to detect information related to the bit rate of the input video.

When the data units 23 are collected and restructured, it is possible to obtain a TS management information table composed of PAT (Program Association Table), PMT (Program Map Table), NIT (Network Information Table), etc.

Herein, the program map table includes, in addition to information such as a table ID and a service ID, a maximum_bit_rate descriptor representing a maximum bit rate of a program, a component_type descriptor representing resolution information, and a stream_type descriptor representing type of a stream.

In the maximum_bit_rate descriptor, the bit rate information of the video, like 10 Mbps or 20 Mbps, is described. Also, in the component_type descriptor, the resolution information of the video, like 1080i or 480i, is described. Also, in the stream_type descriptor, the video encoding format information like MPEG2 or H.264 is described. By extracting these pieces of information, the resolution and bit rate information of the video and the encoding format information of the video signal are detected.

In addition, in a case where the signal is input from a DVD recorder, a LAN terminal or a dedicated signal line is used, whereby it is possible to obtain recording mode information such as XP (high image quality, about 8 Mbps) or SP (standard image quality, about 4 Mbps). Thus, it is possible to detect not only the broadcasting, but also the resolution and bit rate information of the video and the encoding format information of the video signal.

As described above, in the video processing apparatus according to the present embodiment, the video signal input via the input terminal 101 and the input unit 102 are output to the decode unit 103 and the video information detection unit 106. The decode unit 103 decodes the video signal to be output to the scaler unit 104. Also, the error information detected at the time of the decoding is output to the video information detection unit 106.

Next, the video information detection unit 106 detects information related to the image quality of the video based on the video signal from the input unit 102 and the error information from the decode unit 103, and outputs the detection result to the video display size control unit 107. Also, the video information detection unit 106 regularly monitors an interruption of the signal and a change in the image quality of the input video signal and from which input terminal the video signal is input.

The video display size control unit 107 determines the video display size from the video information detection unit 106 based on the information related to the image quality of the input video and a video display size information table held in the memory unit 108. Then, in accordance with the determined video display size, an instruction related to the display size is provided to the scaler unit 104. The scaler unit 104 performs the scaling processing to attain the display size instructed from the decode unit 103 to the video signal input, the video display size determination unit 107. After that, the scaler unit 104 outputs the video signal, which has been subjected to the scaling processing, to the video output unit 105. The video output unit 105 outputs the signal via the video output terminal 109 to the display, whereby the video is displayed on the display.

Figure 3B:
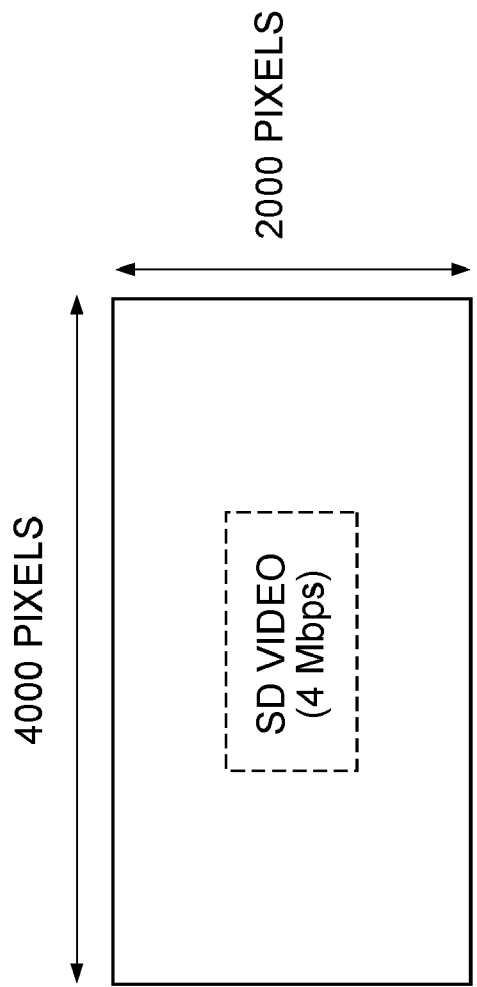
FIGS. 3A and 3B illustrate video display examples according to the first exemplary embodiment of the present invention.
Figure 3A:
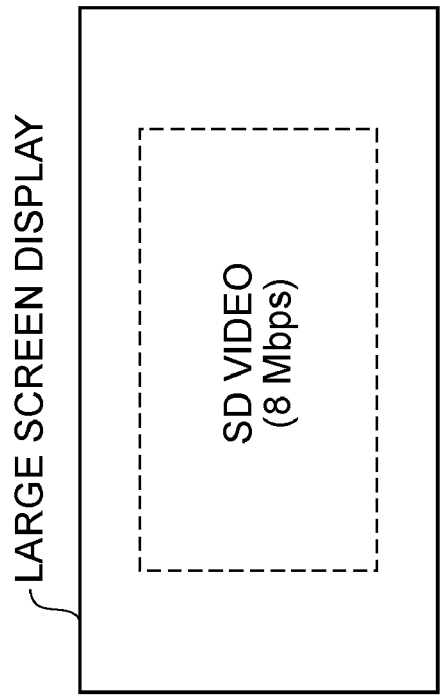

FIGS. 3A and 3B illustrate video display examples according to the present embodiment. In a case where a low resolution video of the SD image quality is displayed on a high resolution display whose number of pixels is 4000×2000, a high image quality video with a high bit rate having the SD resolution is displayed in a relatively large size, and a low image quality video with a low bit rate having the SD resolution is displayed in a relatively small size. This is because when magnified too much, the video looks rough, thus degrading the visibility. Hereinafter, a description will be provided of an operation procedure for realizing such a display example.

Figure 4:
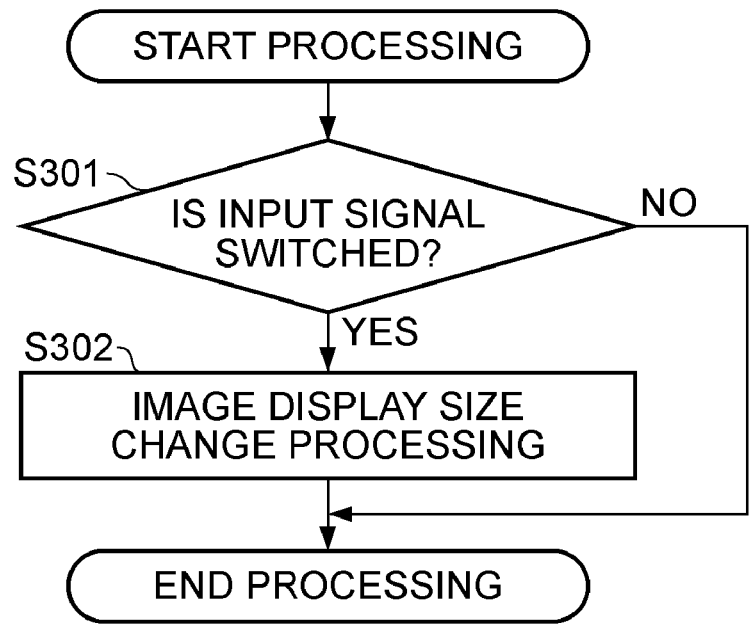
FIG. 4 is a flowchart illustrating a determination procedure for a video display size according to the first exemplary embodiment of the present invention.

FIG. 4 is a flowchart for describing a video display size determination procedure in the video processing apparatus according to the present embodiment.

The video processing apparatus detects, in the video information detection unit 106, whether there is a change in the information related to the interruption of the signal and the change in the image quality of the input video signal, which is input to the input unit 102 (S301).

In Step S301, in a case where the change in the information related to the interruption of the signal and the image quality of the input video signal is detected, a changing processing of the video display size is performed (S302).

On the other hand, as a result of the detection in Step S301, if the signal change is not generated, the video display size determination processing is not performed, but instead the scaling processing is executed by using the previous display size setting.

Figure 5:
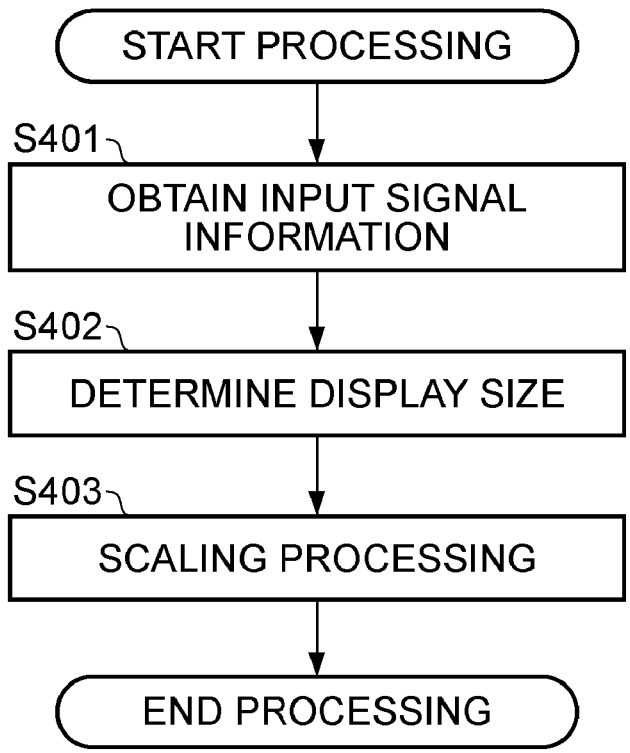
FIG. 5 is a flowchart illustrating the determination procedure for the video display size according to the first exemplary embodiment of the present invention.

FIG. 5 illustrates a detail of the video display size changing processing in Step S302.

First, information of the input video signal is obtained (S401).

This processing is performed in the video information detection unit 106, and as the video information, the resolution information of the video and the bit rate information of the video are detected. The detection of the resolution information of the video and the bit rate information is performed in the above-described manner.

Next, based on the information detected in the video information detection unit 106, the display size control unit 107 performs the display size determination processing (S402).

This processing is executed based on the information related to the image quality of the video detected in Step S401 and the table information of the display size of the video which is held in the memory unit 108.

FIG. 6 illustrates an example of the video display size determination table (the video display size determination information) corresponding to the information related to the image quality of the video held in the memory unit 108.

In the determination table, pieces of the resolution information such as 480i, 480p, and 720p are associated with the bit rate information pieces in the respective resolutions. Furthermore, the image qualities of the video are sorted depending on threshold information of the bit rates, and pieces of the video display size information corresponding to the image qualities are associated to be held. This display size information is determined based on the resolution information of the display apparatus such as the display or the project in advance.

In the determination table, based on the resolution information of the display apparatus, the video display size is determined. Therefore, a plurality of determination tables corresponding to a large number of pieces of resolution information are held in the memory unit 108, and the resolution information of the display apparatus is manually or automatically set, whereby it is possible to set the determination table to be used. In a case where the resolution information of the display apparatus is previously found out, the single determination table corresponding to the resolution information may be stored in the memory unit 108.

Herein, in the case illustrated in FIG. 6, even when the input video resolution is 480i, the video whose bit rate is equal to or lower than 4 Mbps becomes a video with unsatisfactory visibility when magnified too much. Thus, the magnification up to a magnification factor of 2 is performed in which the visibility is maintained. Also, in the case of the same resolution of 480i, the video whose bit rate is equal to or lower than 8 Mbps has a higher image quality than the video whose bit rate is equal to or lower than 4 Mbps. Therefore, as compared with the video whose bit rate is equal to or lower than, degradation in the visibility of the video whose bit rate is equal to or lower than 8 Mbps when magnified is not severe. For this reason, the magnification up to a magnification factor of 3 is performed in which the visibility is maintained.

As compared with the resolution of 480i for the interlace video, the resolution of 480p for the progressive video has a higher image quality when the same bit rate is used. The higher resolution of 720p, etc. achieves a high image quality. Therefore, in a case where the videos of the above-described resolutions are input, as compared with the magnification factor for the input video with the resolution of 480i, the display size is also set large. For the video display size held in the determination table, a display size considered to be optimal may be set based on data from experience, etc.

Returning to FIG. 5, based on the video display size information determined in Step S402, the scaling processing is executed in the scaler unit 104 (S403).

As a result of these processings, based on the information related to the image quality of the input video signal, the video is displayed in an appropriate display size.

In the above-described processing, the video display size is determined based on the information related to the image quality such as the resolution information and the bit rate information. However, the image quality state is varied depending on a difference in the video encoding format, such as MPEG2 or H.264. By making a determination in consideration with the format information of the video signal, it is possible to determine the display size in accordance with a characteristic of the video signal.

FIG. 7 illustrates a determination table example of the video display size in which the video encoding format information is also evaluated in addition to the video resolution information and the bit rate information.

In addition to the determination table information illustrated in FIG. 6, the encoding format information of the video signal such as MPEG2 or H.264 is prescribed. Then, in accordance with a combination of the resolution information, the format information, and the bit rate information, the video display size is defined.

As the video display size is determined in Step S402 based on the table information of FIG. 7, it is possible to display the video in a size at which the visibility is not degraded in accordance with the image quality of the input video.

Furthermore, as the information related to the image quality of the video, image quality characteristic information of the video signal such as the error rate at the time of the decoding or the noise error amount in a noise reduction processing can also be utilized. For example, FIG. 8 illustrates an adjustment table example of the video display size by utilizing the error information at the time of the video decoding.

The memory unit 108 stores, in addition to the determination table illustrated in FIG. 6 or 7, information illustrated in FIG. 8 as the display size adjustment table. This adjustment table is utilized for adjusting the video display size determined based on the determination table illustrated in FIG. 6 or 7 by using the error information. As the video information detection unit 106 obtains the error rate at the time of the decoding from the decode unit 103, the display size control unit 107 can perform the adjustment of the video display size.

In the case illustrated in FIG. 8, in a case of the video signal in which a small error is generated, 1.0 is multiplied with respect to the video display size. In other words, the video display size determined based on the determination table is not changed. However, in a case where the error generation level is medium, the viewer may easily detect the noise after the noise mixed video is magnified to be displayed. Thus, there is a possibility that the image quality may be degraded as the result, and therefore 0.9 is multiplied with respect to the video display size determined based on the determination table.

In other words, as compared with the case where no error generation is occurred, the video display size is reduced. In addition, in a case where the error generation level is large, the display size reduction is further advanced, and such a setting is made that 0.8 is multiplied with respect to the video display size determined based on the determination table.

The image quality of the input video also depends on the difference in the video input terminal. Therefore, the information on the input terminal to which the video signal is input is utilized to adjust the video size, thereby making it possible to perform the video display size adjustment further in accordance with the image quality.

The memory unit 108 holds, in addition to the determination table illustrated in FIG. 6 or 7, information illustrated in FIG. 9 as the display size adjustment table. This adjustment table is utilized for adjusting the video display size based on the determination table illustrated in FIG. 6 or 7 by using the information on the type of the input terminal to which the video signal is input. The video information detection unit 106 obtains the information on the terminal to which the video signal is input from the input unit 102, whereby the display size control unit 107 can perform the video display size adjustment.

In the case illustrated in FIG. 9, the video display size adjustment information for analog input terminals such as a composite terminal and an S terminal and for a digital input terminals such as a DV terminal and an HDMI terminal is held.

The digital input based on the DV terminal, the HDMI terminal, etc. causes a small degradation in the image quality, and the video display size determined based on the determination table is not adjusted. Therefore, in this case, 1.0 is multiplied as an adjustment factor. However, a D terminal and a component terminal can transmit a high image quality video based on a color difference input of Y/Cb/Cr, but the analog signal relatively has the image quality degradation as compared with the digital input. For this reason, 0.9 is multiplied with respect to the video display size determined based on the determination table.

In other words, the video display size is reduced as compared with the digital input. With a similar concept, the signal input by utilizing the S terminal in which the image quality is lowered as compared with the case of the D terminal, such a setting is made that 0.8 is multiplied with respect to the video display size. Also, the signal input by utilizing the composite terminal in which the image quality is further lowered as compared with the case of the S terminal, such a setting is made that 0.7 is multiplied with respect to the video display size.

As described above, according to the present embodiment, the information related to the image quality of the input video signal is used to determine the optimal image size to be displayed on the display apparatus. With this configuration, it is possible to display the video appropriate to the viewer.

In addition, as the image size can be adjusted in accordance with the error information, the type of the input terminal, etc., it is possible to magnify and display the video without emphasizing the image quality degradation caused by the image magnifying processing.

Next, an embodiment in which a video display size can be adjusted through an input from a user will be described. According to the first exemplary embodiment, the video display size determined based on the determination table is kept to the same video display size unless the information related to the image quality of the video is changed. In contrast, according to the present embodiment, the video display size determined based on the determination table can be adjusted arbitrarily by the user.

Figure 10:
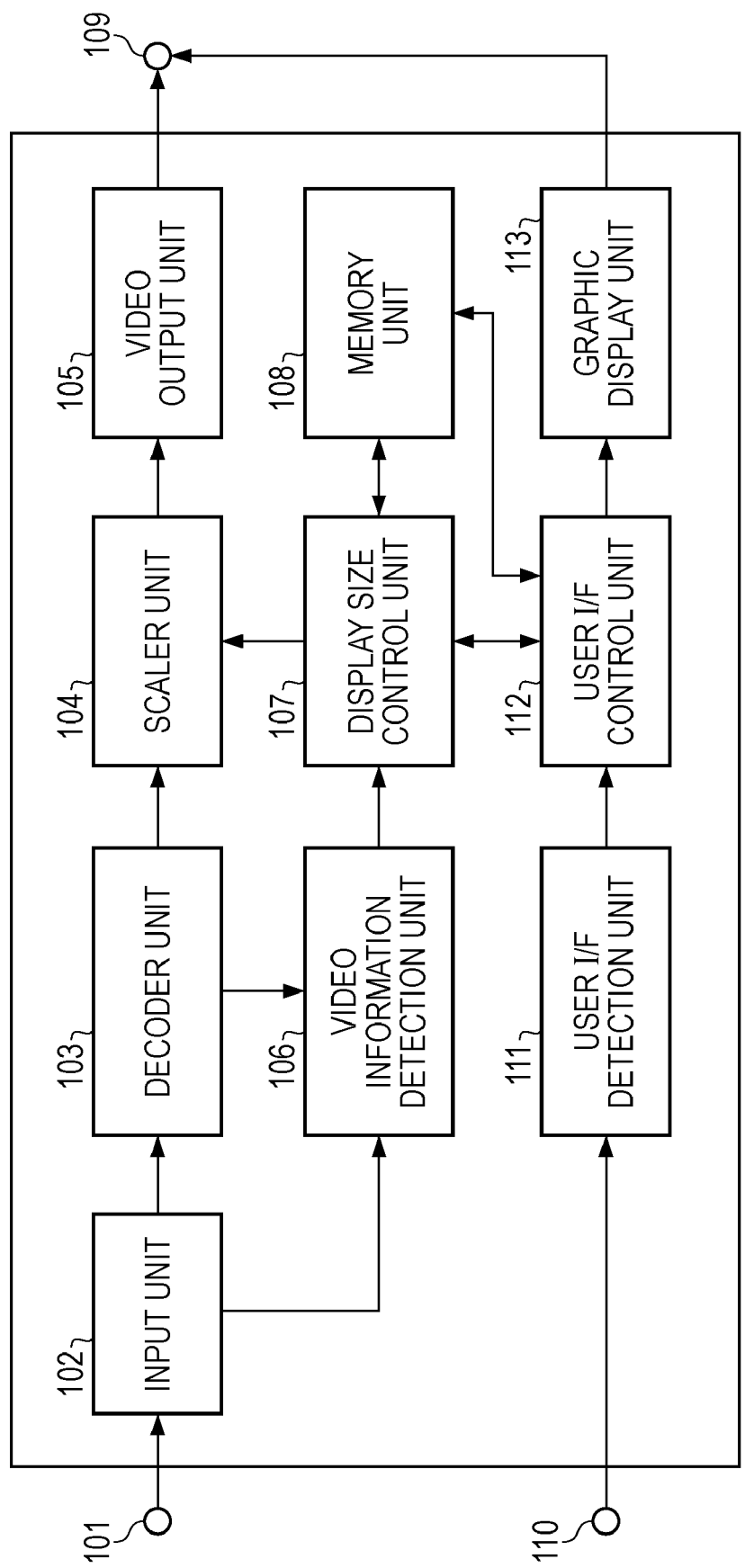
FIG. 10 is a block diagram of a video processing apparatus according to a second exemplary embodiment of the present invention.

FIG. 10 is a block diagram of a video processing apparatus according to the present embodiment. The same reference numerals as the block diagram illustrated in FIG. 1 are allocated to the units in FIG. 10 that have similar functions to those in FIG. 1, and a description thereof will be omitted herein.

An I/F signal input terminal 110 receives an operation input signal by the user using a key board, a remote controller, etc. A user I/F signal detection unit 111 is configured to detect the user operation signal received at the user I/F signal input terminal 110 and analyze the signal content. According to the present embodiment, a user can perform the operation for instructing the magnification or reduction of the displayed video.

A user I/F control unit 112 is configured to notify the display size control unit 107 of information utilized for controlling the video display size based on the operation signal detected and analyzed by the user I/F signal detection unit 111.

Furthermore, a graphic display unit 113 is configured to display the screen for the user to operate or the operation result as a graphic user interface (GUI) in response to the instruction from the user I/F control unit 112.

Figure 11:
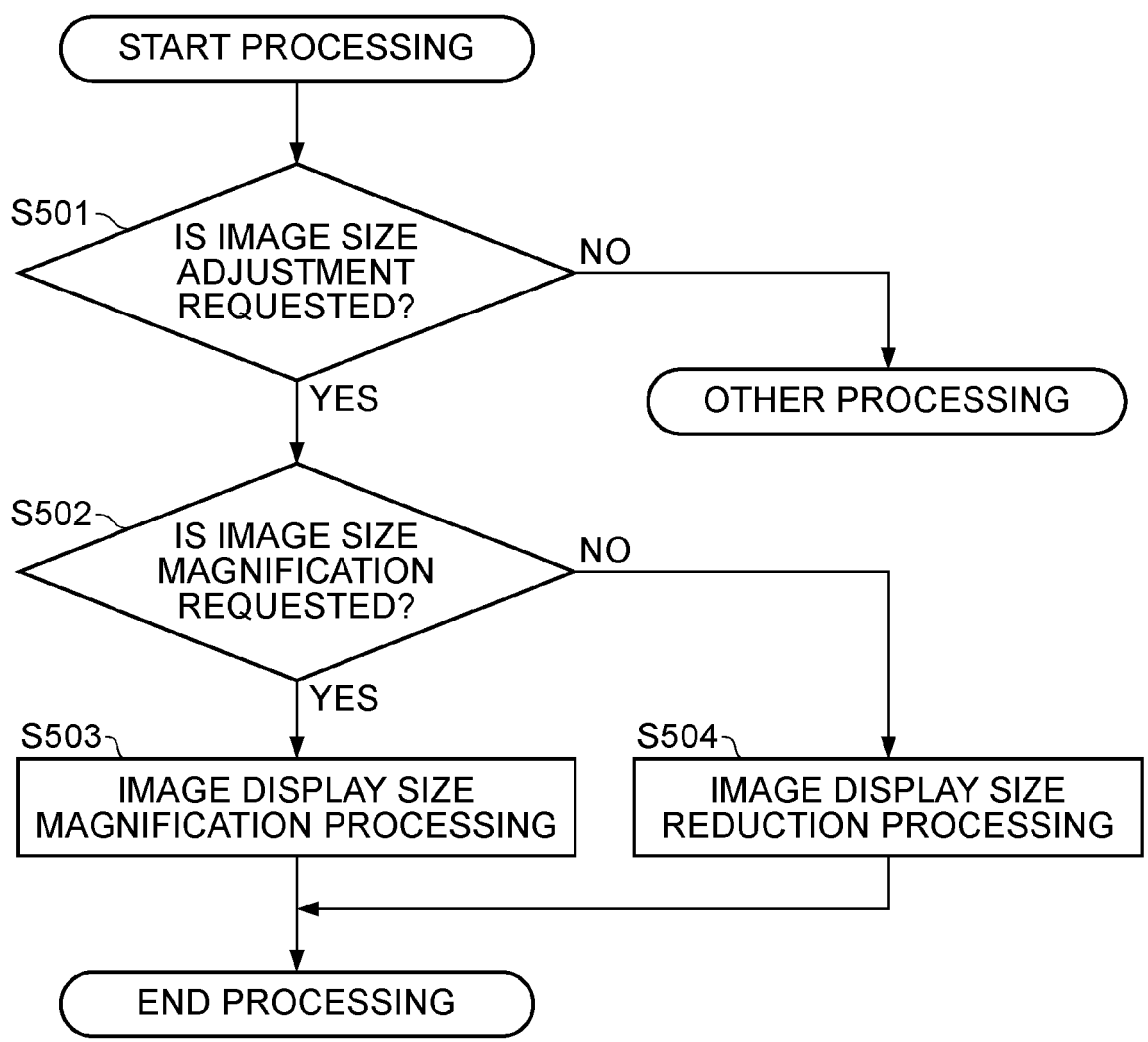
FIG. 11 is a flowchart illustrating an adjustment procedure for a video display size according to the second exemplary embodiment of the present invention.

FIG. 11 is a flowchart for describing a determination procedure of the video display size in the video processing apparatus according to the present embodiment. For the purposes of describing FIG. 11, it is presumed that the video input from the input terminal 101 of the video processing apparatus is displayed on the display apparatus.

First, a result of the analysis made by the user I/F detection unit 111 on the operation signal from the user which is received at the user I/F signal input terminal 110 is input to the user I/F control unit 112. Then, the user I/F control unit 112 determines whether the instruction from the user is an adjustment instruction for the video display size (S501).

If the user I/F control unit 112 determines that the instruction is for the adjustment processing on the video display size, the user I/F control unit 112 further determines whether the instruction from the user is the adjustment instruction for the video, herein, the magnification request (S502).

If the user I/F control unit 112 determines that the instruction from the user is the video magnification request, the user I/F control unit 112 issues an instruction for requesting the magnification processing to the display size control unit 107. The display size control unit 107 having received the instruction instructs the scaler unit 104 so that the current video display size is changed to a further magnified video display size. In the scaler unit 104, the video signal is subjected to the scaling in accordance with the instruction from the display size control unit 107, and the video subjected to the scaling is sent via the video output unit 105 to the display apparatus (S503).

If the user I/F control unit 112 determines that the instruction from the user is not the video magnification request in Step S502, that is, the user I/F control unit 112 determines that the instruction from the user is the video reduction request, the process advances to Step S504. In Step S504, the user I/F control unit 112 issues an instruction for requesting the reduction processing to the display size control unit 107. The display size control unit 107 having received the instruction instructs the scaler unit 104 so that the current video display size is changed to a further reduced video display size. In the scaler unit 104, the video signal is subjected to the scaling in accordance with the instruction from the display size control unit 107, and the video subjected to the scaling is sent via the video output unit 105 to the display apparatus.

By executing the above-described process, it is possible for the user to adjust the video display size. Also, the adjustment result of the display size by the user can reflect the video display size information of the video display size determination table held in the memory unit 108 (the table illustrated in FIG. 6 or 7).

Figure 12:
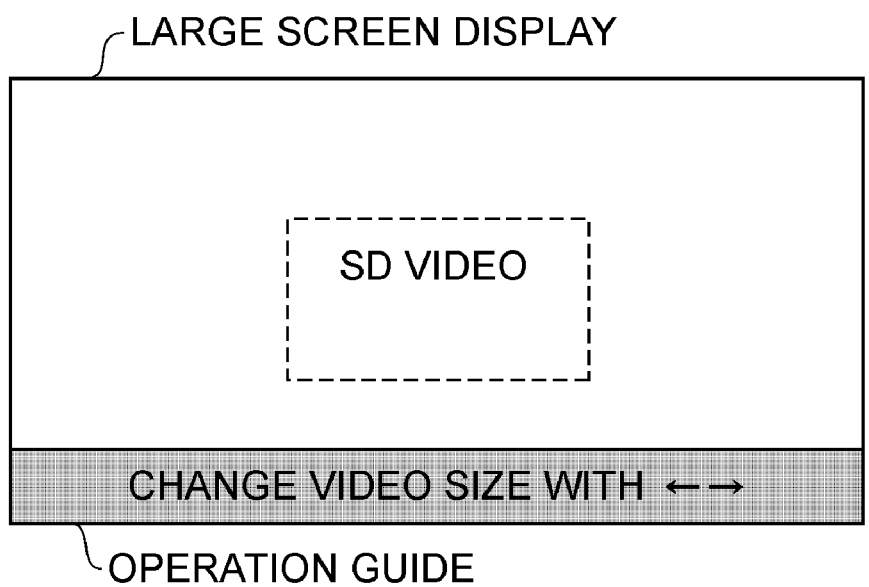
FIG. 12 illustrates a GUI example for a video display size adjustment according to the second exemplary embodiment of the present invention.

In order that the above-described adjustment processing for the video display size is executed by the user, the graphic display unit may display the GUI illustrated in FIG. 12 on the display apparatus. In the case illustrated in FIG. 12, the presence of the operation guide represents that it is possible to adjust the display size of the SD image quality video with the video display size determined via the method described in the first embodiment can be adjusted by the user using the remote controller.

Figure 13:
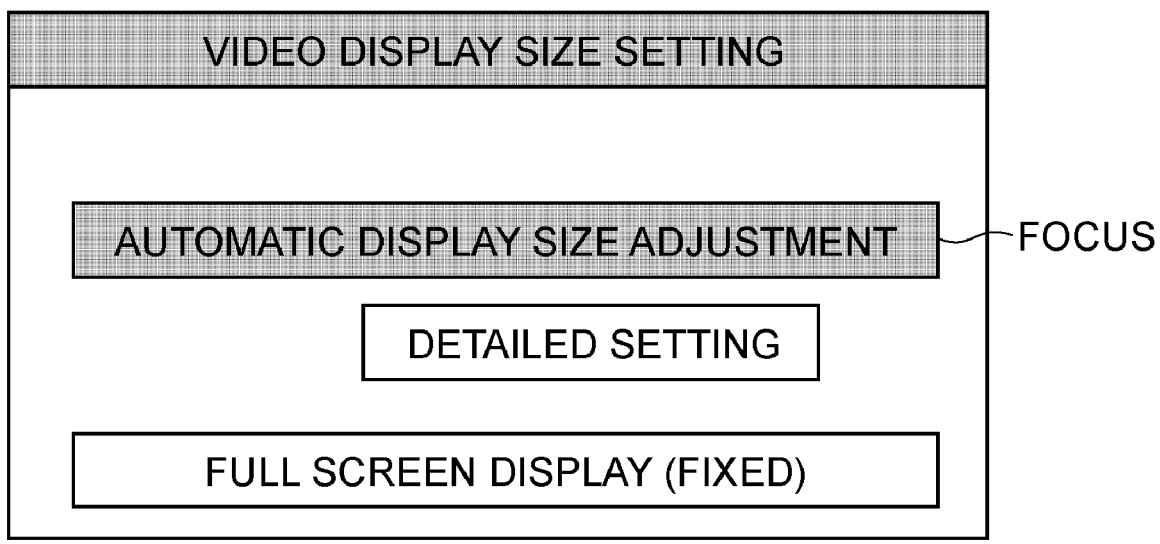
FIG. 13 illustrates a GUI example for a video display size setting menu according to other embodiment of the present invention.

According to the above-described first embodiment, the information related to the image quality of the input video is used to automatically determine the video display size. Also, the video processing method illustrated according to the first embodiment and the conventional full screen display method can be selected by the user. FIG. 13 illustrates a setting screen example for the video display size determination in this case. This setting screen is presented to the user as the GUI.

In the example of FIG. 13, items of the automatic display setting for the video size and a fixed setting with which the video is always magnified to the full screen for the display can be selected by the user. Also, a detailed setting can be made to determine how adjustment is performed at the time of the automatic display. As a setting menu for the video processing apparatus, a menu for the video display size setting is provided. When the user selects this menu, a GUI as illustrated in FIG. 13 is displayed.

In a case where the user utilizes the GUI illustrated in FIG. 13 to press a full screen display (fixed) button for determining the setting, the processing of according to the above-described first embodiment is not executed, and the video is always magnified to the full screen size and displayed irrespective of the input video size, the encoding format, etc. When an automatic display size adjustment button is selected to determine the setting, the processing according to the first embodiment is executed. When a detailed setting button is selected, the display size information held in the determination table illustrated in FIG. 6 or 7 can be arbitrarily changed by the user.

With the video processing method described according to the second embodiment, the video display size can be changed through the instruction from the user during the display of the input video. In contrast, according to the example of FIG. 13, the user can previously select as the setting value of the video processing apparatus between that the video display size is previously determined with the method according to the first embodiment and that the video display size is always the full screen size. In other words, the display size control unit 107 can execute both the display control with the full screen size and the display control with the video display size determined through the method according to the first embodiment.

According to the example of FIG. 13, regardless of the information related to the image quality of the video, the video is always magnified to the full screen size and displayed, but the present invention is not limited to the full screen size display. A case in which the video is displayed in a certain display size regardless of the information related to the image quality is within the scope of the present invention.

With such a configuration, the user can arbitrarily select between the conventional video display method with which the video is always displayed to the full screen and that the automatic size adjustment in accordance with the image quality information described according to the first embodiment.

As described above, according to the embodiments of the present invention, in a case where video processing is performed so that the low image quality video is displayed on the display apparatus, it is possible to display the video with the visibility which is satisfactory and appropriate to the viewer.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-341402 filed Dec. 19, 2006, which is hereby incorporated by reference herein in its entirety.

What is claimed is:

1. A video processing apparatus for expanding a video signal whose resolution is lower than a resolution of a display unit, the video processing apparatus comprising:
   an input unit configured to receive an input of the video signal;
   an obtaining unit configured to obtain at least resolution information among information related to an image quality of the video signal received by the input unit;
   a holding unit configured to hold video display size determination information associating a display resolution in a case where a video signal at respective set resolutions is displayed on the display unit with each of plural types of set resolutions that the input video signal can take; and
   a control unit configured to determine the display resolution associated with the set resolution that is matched with the resolution information obtained by the obtaining unit by using the video display size determination information and expand the video signal received by the input unit to have the determined display resolution,
   wherein the control unit adjusts the determined display resolution in accordance with an image quality characteristic of the video signal or a type of an input terminal for the video signal.

2. The video processing apparatus according to claim 1, wherein regardless of the resolution information of the video signal, the control unit selectively executes, in response to an instruction from a user, any one of a control for expanding the inputted video signal to have a predetermined display resolution and a control for determining the display resolution in accordance with the resolution information of the inputted video signal.

3. A control method for a video processing apparatus for expanding a video signal whose resolution is lower than a resolution of a display unit, the video processing apparatus including a holding unit configured to hold video display size determination information associating a display resolution in a case where a video signal at respective set resolutions is displayed on the display unit with each of plural types of set resolutions that the inputted video signal can take, the method:

receiving an input of the video signal;

obtaining at least resolution information among information related to an image quality of the received video signal; and controlling for determining the display resolution associated with the resolution that is matched with the obtained resolution information by using the video display size determination information and expand the received video signal to have the determined display resolution information, wherein the determining display resolution is adjusted in accordance with an image quality characteristic of the video signal or a type of an input terminal for the video signal.

4. The method according to claim 3, wherein regardless of the resolution information of the video signal, in response to an instruction from a user, any one of a control for expanding the inputted video signal to have a predetermined display resolution and a control for determining the display resolution in accordance with the resolution information of the inputted video signal is selectively executed.

5. The video processing apparatus according to claim 1, wherein the video display size determination information associates a display resolution in a case where a video signal corresponding to respective combinations with each of combinations of plural types of bit rates and/or plural types of encoding format information in addition to the plural types of resolutions, wherein the obtaining unit obtains the bit rates and/or the encoding format information in addition to the resolution of the video signal received by the input unit, and wherein the control unit determines the display resolution by using the resolution information, the bit rates and/or the encoding format information obtained by the obtaining unit, and the video display size determination information.

6. The control method for the video processing apparatus according to claim 3, wherein the video display size determination information associates a display resolution in a case where a video signal corresponding to respective combinations with each of combinations of plural types of bit rates and/or plural types of encoding format information in addition to the plural types of resolutions, wherein the bit rates and/or the encoding format information are obtained in addition to the resolution information of the received video signal, and wherein the display resolution is determined by using the obtained resolution information, the obtained bit rates and/or the encoding format information and the video display size determination information.

* * * * *